US007484705B2

(12) United States Patent
Hand et al.

(10) Patent No.: US 7,484,705 B2
(45) Date of Patent: Feb. 3, 2009

(54) LIGHTING ADAPTER FOR PARTITION FRAMES

(75) Inventors: Richard S. Hand, Pace, FL (US); Michael P. Kelley, Rockford, MI (US); Shanell M. Langston, Muskegon Hts., MI (US)

(73) Assignee: Steelcase Inc., Grand Rapids, MI (US)

( * ) Notice: Subject to any disclaimer, the term of this patent is extended or adjusted under 35 U.S.C. 154(b) by 439 days.

(21) Appl. No.: 10/884,086

(22) Filed: Jul. 2, 2004

(65) Prior Publication Data

US 2006/0010787 A1 Jan. 19, 2006

(51) Int. Cl.
*A01K 97/10* (2006.01)

(52) U.S. Cl. ....................................... 248/535; 248/519

(58) Field of Classification Search ................. 248/534, 248/535, 536, 541, 519, 511, 218.4, 525, 248/61, 225.11; 116/173, 174; 52/296, 297, 52/704, 710

See application file for complete search history.

(56) References Cited

U.S. PATENT DOCUMENTS

| | | | | |
|---|---|---|---|---|
| 2,981,583 | A | | 4/1961 | Eisenberg |
| 3,034,609 | A | | 5/1962 | Young |
| 3,305,981 | A | | 2/1967 | Biggs et al. |
| 3,389,246 | A | | 6/1968 | Shemitz |
| 3,730,477 | A | | 5/1973 | Wavrunek |
| 3,778,939 | A | | 12/1973 | Nelsson |
| 3,828,495 | A | | 8/1974 | Law |
| RE28,408 | E | | 5/1975 | Nelsson |
| 4,097,918 | A | | 6/1978 | Anderson et al. |
| 4,278,834 | A | | 7/1981 | Boundy |
| 4,351,017 | A | | 9/1982 | Ball |
| 4,441,300 | A | | 4/1984 | Varon et al. |
| 4,443,979 | A | | 4/1984 | Varon et al. |
| 4,535,525 | A | | 8/1985 | Varon et al. |
| 4,667,275 | A | | 5/1987 | Herst et al. |
| 5,092,253 | A | | 3/1992 | Grund et al. |
| 5,189,850 | A | | 3/1993 | Felton |
| 5,463,973 | A | * | 11/1995 | Tait ............................ 116/173 |
| 5,568,784 | A | * | 10/1996 | Willis et al. ................. 116/173 |
| D387,064 | S | * | 12/1997 | Heine ........................ D14/238 |
| 5,765,793 | A | | 6/1998 | Yu |
| 5,806,967 | A | | 9/1998 | Soorus et al. |
| 5,839,240 | A | | 11/1998 | Elsholz et al. |

(Continued)

FOREIGN PATENT DOCUMENTS

WO WO 93/22517 A2 11/1993

*Primary Examiner*—A. Joseph Wujciak, III
(74) *Attorney, Agent, or Firm*—Quarles & Brady, LLP

(57) ABSTRACT

An adapter for attaching an accessory, such as a light, to a partition frame is disclosed. In one form, the adapter includes two opposed brackets. Each bracket has a base, a side wall extending downwardly from the base, a flange extending inwardly from the side wall, and a wall extending upwardly from the base. The brackets may be installed to the partition frame by inserting the flange of each bracket in a slot in the side of the partition frame. When the brackets are installed to the partition frame, a post structure including the upright walls is formed. The post structure is used for attaching the accessory. In another form, the adapter includes a post and a support member. The support member may mounted to the partition frame or to a mounting bracket attached to the partition frame. The post may be used for attaching the accessory.

8 Claims, 8 Drawing Sheets

U.S. PATENT DOCUMENTS

| | | | | |
|---|---|---|---|---|
| 6,167,664 | B1 | 1/2001 | Reuter et al. | |
| 6,250,019 | B1 | 6/2001 | Simons, Jr. et al. | |
| 6,260,324 | B1 | 7/2001 | Miedema et al. | |
| 6,282,854 | B1 | 9/2001 | Vos et al. | |
| 6,363,663 | B1 | 4/2002 | Kane et al. | |
| 6,389,773 | B1 | 5/2002 | Reuter et al. | |
| 6,415,567 | B1 | 7/2002 | Mead et al. | |
| 6,513,288 | B1 | 2/2003 | MacDonald et al. | |
| 6,550,875 | B1 | 4/2003 | Compton et al. | |
| 6,557,483 | B2 * | 5/2003 | Nathan | 116/28 R |
| 2003/0051415 | A1 | 3/2003 | Remelts et al. | |
| 2003/0182871 | A1 | 10/2003 | Gresham et al. | |
| 2006/0124812 | A1 * | 6/2006 | Berardi | 248/225.11 |

* cited by examiner

FIG. 2
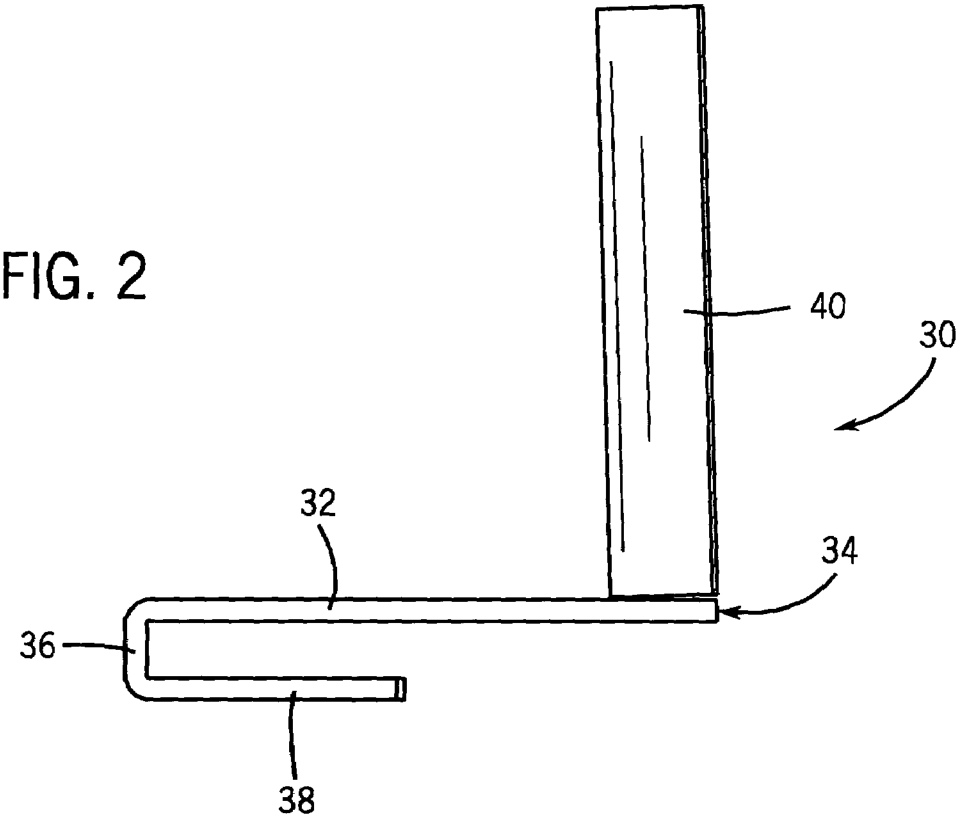
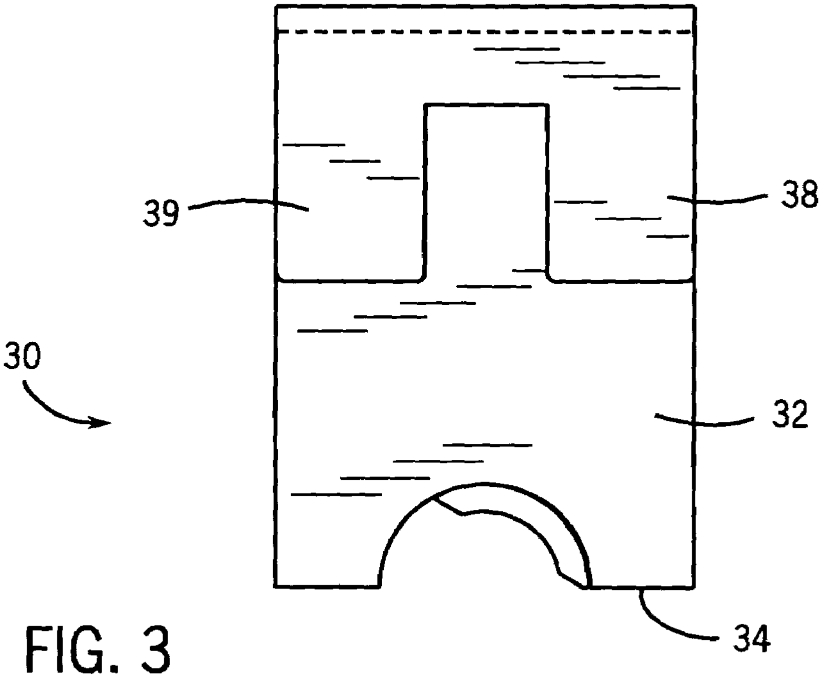
FIG. 3

LIGHTING ADAPTER FOR PARTITION FRAMES

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates to adapters for attaching an accessory, such as a light, a privacy screen or a storage unit, to the partition frame of a workspace panel.

2. Description of the Related Art

Office managers have widely adopted workspace panels including partition frames as a cost effective and efficient choice for constructing workspaces for office workers. Typically, office managers prefer to use workspace panels instead of architectural walls when designing a work area because workspace panels can be readily disassembled and reconfigured as needed to satisfy the changing needs of the office workers. Thus, workspace panels provide considerably more flexibility when designing work areas than is possible with architectural walls. Later redesigns of existing work areas are also considerably less expensive when workspace panels are used than when architectural walls are used. Examples of workspace panels and partition frames can be found in U.S. Pat. Nos. 6,513,288, 6,415,567, 6,250,019, 5,839,240 and 4,097,918 and U.S. Patent Application No. 2003/0051415.

Many workspace panels, however, provide a limited degree of usefulness beyond the basic function of separating individual workspaces. Accordingly, many workspace panels provide little more than simple separating partitions that can be connected together at the sides to form work spaces therein. This disadvantage lowers the work efficiency of office workers and lowers the office worker's satisfaction with the work area. Thus, there is a need for workspace panels with greater versatility and increased functionality.

One need that exists is an adapter for attaching a variety of accessories, such as lights, privacy screens and storage units for pens and files, anywhere along the top of the workspace panel. Desirably, the adapter would be readily attachable to older workspace panels already in use within existing work areas so that office managers could update older workspace panels inexpensively.

SUMMARY OF THE INVENTION

The foregoing needs are met by an adapter according to the invention for attaching an accessory, such as a light, a privacy screen or a storage unit, to the partition frame of a workspace panel.

In one aspect, the invention provides an adapter for attaching an accessory to a partition frame. The partition frame includes a top cap attached to a horizontal top frame member that has a first side with at least one slot and a spaced apart opposed second side with at least one slot.

The adapter includes a first bracket including a first base and a first edge, a first side wall extending downwardly from the first base at a location opposite the first edge, a first flange extending from the first side wall toward the first edge, and a first upright wall extending upwardly from the first base. The first bracket is dimensioned such that the first base may be installed over a first portion of the top cap by inserting the first flange in a slot in the first side of the horizontal top frame member.

The adapter also includes a second bracket including a second base having a second edge, a second side wall extending downwardly from the second base at a location opposite the second edge, a second flange extending from the second side wall toward the second edge, and a second upright wall extending upwardly from the second base. The second bracket is dimensioned such that the second base may be installed over a second portion of the top cap by inserting the second flange in a slot in the second side of the horizontal top frame member.

When the first bracket and the second bracket are installed over the top cap, a post structure including the first upright wall and the second upright wall is formed. The post structure is used for attaching the accessory. In one form, the adapter includes a stanchion having a recess, and the recess is dimensioned so that the stanchion may be installed on the post structure by placing the post structure in the recess. The stanchion may then be used for attaching the accessory, such as a light.

Preferably, the stanchion has a hole extending from an outer surface of the stanchion to the recess, and the hole being dimensioned to accept a power cord of the accessory. Thus, the hole and the recess of the stanchion and post structure provide for management of the power cord of the accessory. Preferably, the first upright wall and the second upright wall of the first and second bracket each have a horizontal cross-section in the shape of an arc of less than 180 degrees such that the post structure has a horizontal cross-section of an arc of less than 360 degrees. This configuration also provides for management of the power cord of the accessory.

In another aspect, the invention provides an adapter for attaching an accessory to a partition frame. The partition frame includes a top cap having an aperture and a horizontal top frame member.

In installations where the horizontal top frame member of the partition frame does not include an upper channel, the adapter includes a mounting bracket having an upper surface and an upper channel extending downwardly from the upper surface. The mounting bracket is dimensioned for attachment to the horizontal top frame member of the partition frame. In installations where the horizontal top frame member of the partition frame includes an upper channel, the adapter need not include the mounting bracket.

The adapter also includes a post and a support member. The post has opposed first and second end openings and a pathway extending between the first and second end openings. In one form, the post is a cylindrical tube. The support member has a base section and a protruding elongated strip extending downwardly from the base section. The support member has a passageway extending from an upper orifice in the top surface of the base section to an exit orifice of the support member. The tubular post is mounted to the support member such that the second end opening of the post and the upper orifice are placed in an adjacent relationship. The support member is mounted in the mounting bracket such that the strip of the support member is positioned within the upper channel of the mounting bracket. The post is dimensioned to fit in the aperture of the top cap such that the post may protrude through the top cap and be used for attaching the accessory. The pathway of the post and the passageway of the support member provide for management of the power cord of the accessory.

The base section may be dimensioned such that a portion of the base section contacts the upper surface of the mounting bracket. Also, the base section may include at least one hole extending through the portion of the base section that contacts the upper surface of the horizontal top frame so that a fastener may be inserted in each hole for securing the support member to the mounting bracket.

These and other features, aspects, and advantages of the present invention will become better understood upon consideration of the following detailed description, drawings, and appended claims.

BRIEF DESCRIPTION OF THE DRAWINGS

FIG. 2 is a front view of the first bracket shown in FIG. 1.

FIG. 3 is a bottom view of the first bracket shown in FIG. 1.

Like reference numerals are used to depict like parts throughout the Figures.

DETAILED DESCRIPTION OF THE INVENTION

Figure 8:
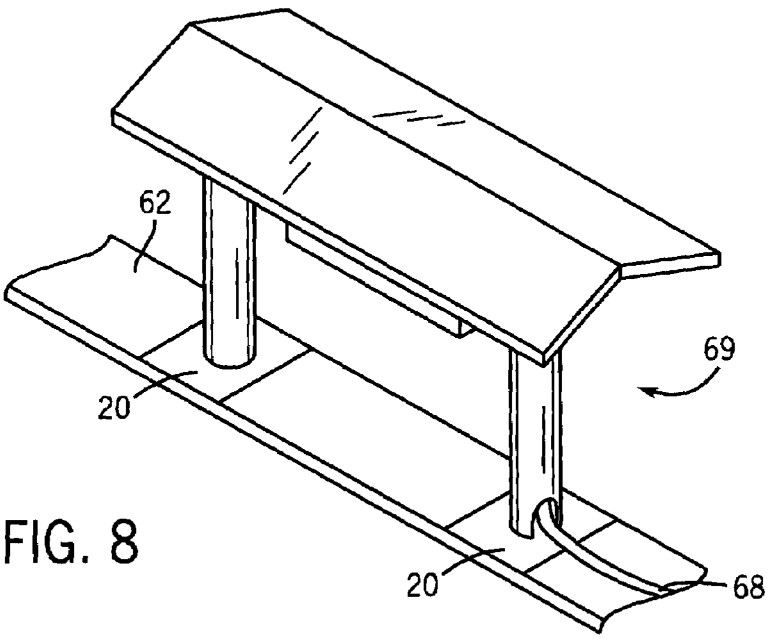
FIG. 8 is a perspective view of a light installed on a partition frame using two adapters according to the invention.
Figure 1:
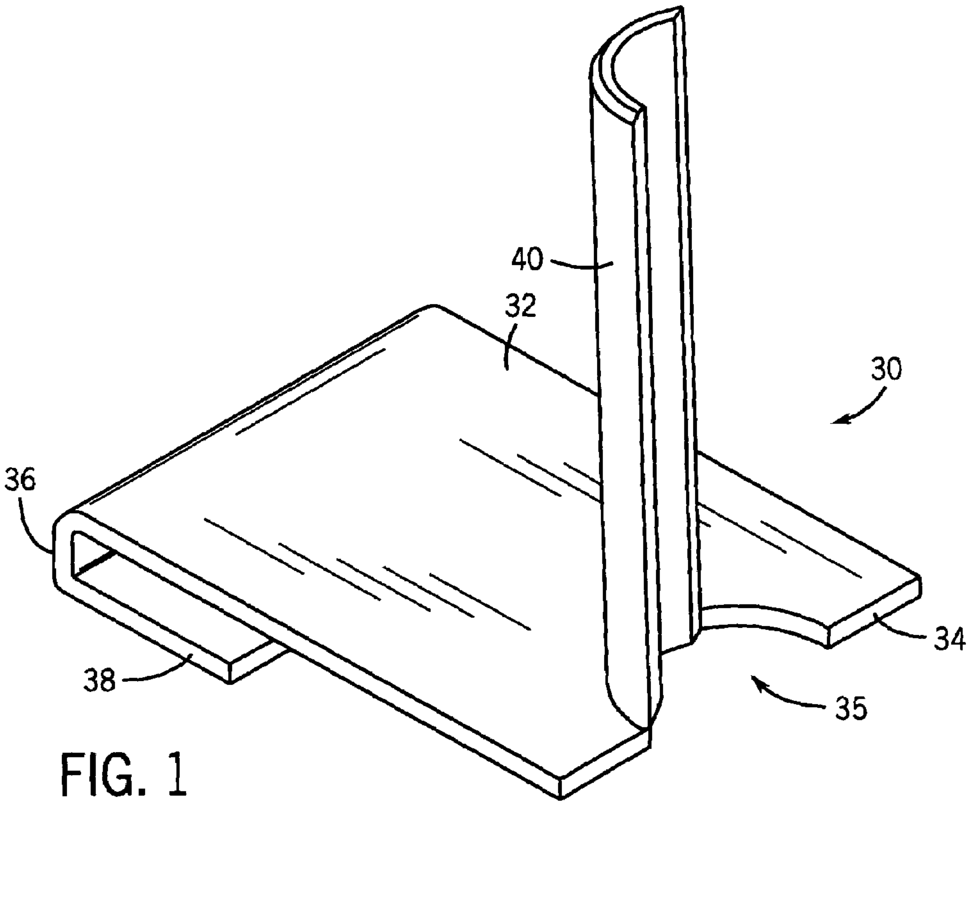
FIG. 1 is a perspective view of a first bracket of an adapter according to the invention, the second bracket being a mirror image thereof in one embodiment of the adapter.

Referring first to FIGS. 1-8, there is shown a first embodiment of an adapter, indicated generally at 20, for attaching an accessory to a partition frame. The adapter 20 includes a first bracket 30 and a second bracket **30*b* that is a mirror image of the first bracket 30. The first bracket 30 and the second bracket 30*b* form the adapter 20 as explained below. The first bracket 30 and the second bracket 30*b*** may be constructed of various materials including, for example, metallic materials and polymeric materials.

The first bracket 30 (shown in FIGS. 1-3) includes a base 32 and an inner edge 34 with an inwardly directed notch 35. A side wall 36 extends downwardly from the base 32 at a location opposite the inner edge 34. A pair of flanges 38 and 39 extends from the side wall 36 toward the inner edge 34, and an upright wall 40 extending upwardly from the base 32 at a location near the notch 35.

The second bracket **30*b* includes a base 32*b* and an inner edge 34*b* with an inwardly directed notch. A side wall 36*b* extends downwardly from the base 32*b* at a location opposite the inner edge 34*b*. A pair of flanges (of which 39*b* is shown) extends from the side wall 36*b* toward the inner edge 34*b*, and an upright wall 40*b* extending upwardly from the base 32*b* at a location near the inner edge 34*b***.

Figure 4:
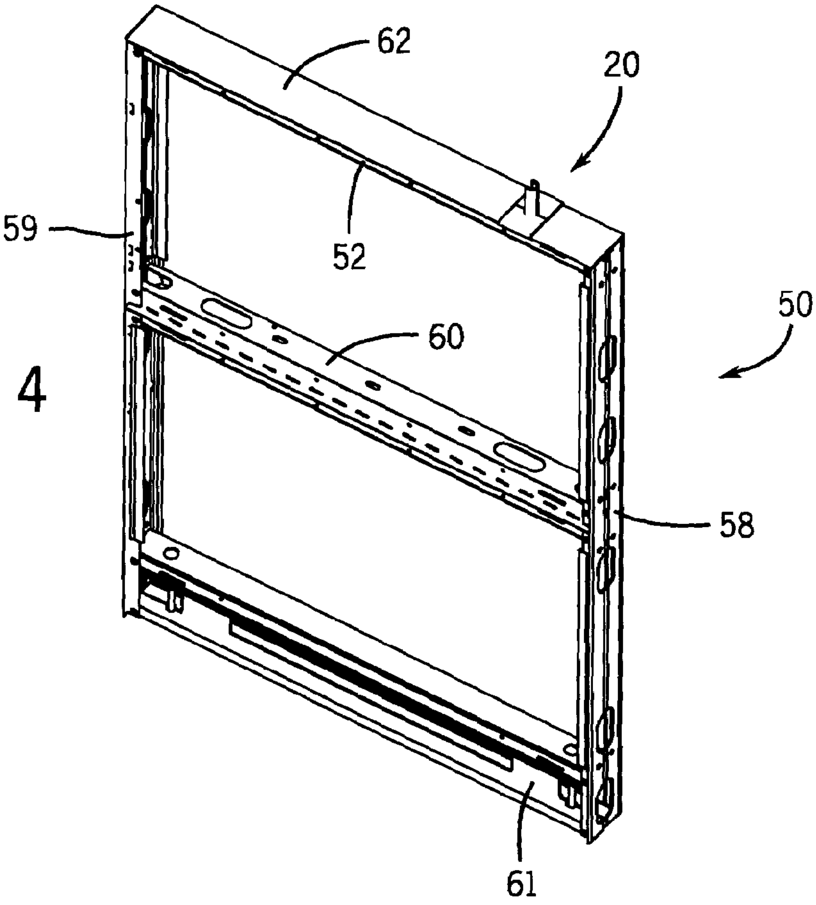
FIG. 4 is a perspective view of a partition frame having installed thereon an adapter according to the invention.
Figure 5:
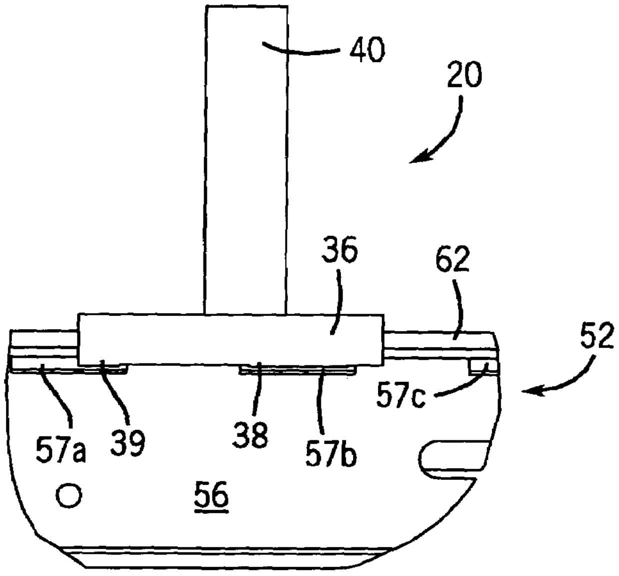
FIG. 5 is partial side view of a partition frame having installed thereon an adapter according to the invention.

The adapter 20 is installed on a partition frame 50 as shown in FIG. 4. The partition frame 50 includes a horizontal top frame member 52, a middle horizontal frame member 60, a bottom horizontal frame member 61 and opposed uprights 58 and 59 that are assembled to the horizontal top frame member 52, the middle horizontal frame member 60, and the bottom horizontal frame member 61, which rests on the floor. Covers may be placed over the partition frame 50 to form a workspace panel. The horizontal top frame member 52 has a first side 54 and an opposed second side 56. The first side 54 has a plurality of horizontal slots and FIG. 5 shows three of these slots **57*a*, 57*b* and 57*c*. The second side 56** has similar horizontal slots. Typically, the partition frame components are formed from metallic materials.

Figure 6:
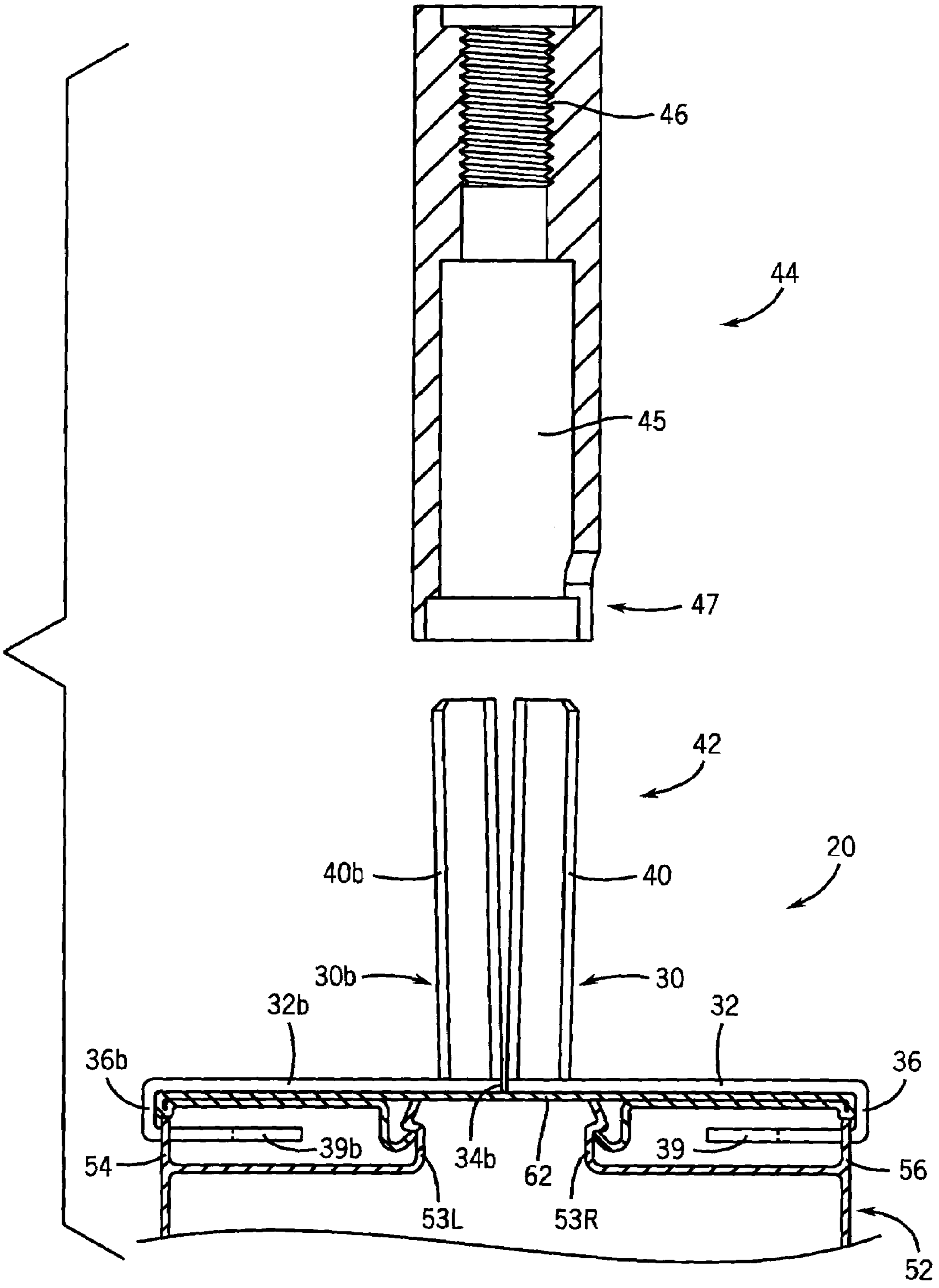
FIG. 6 is an exploded end view of an adapter according to the invention installed on a partition frame.
Figure 7:
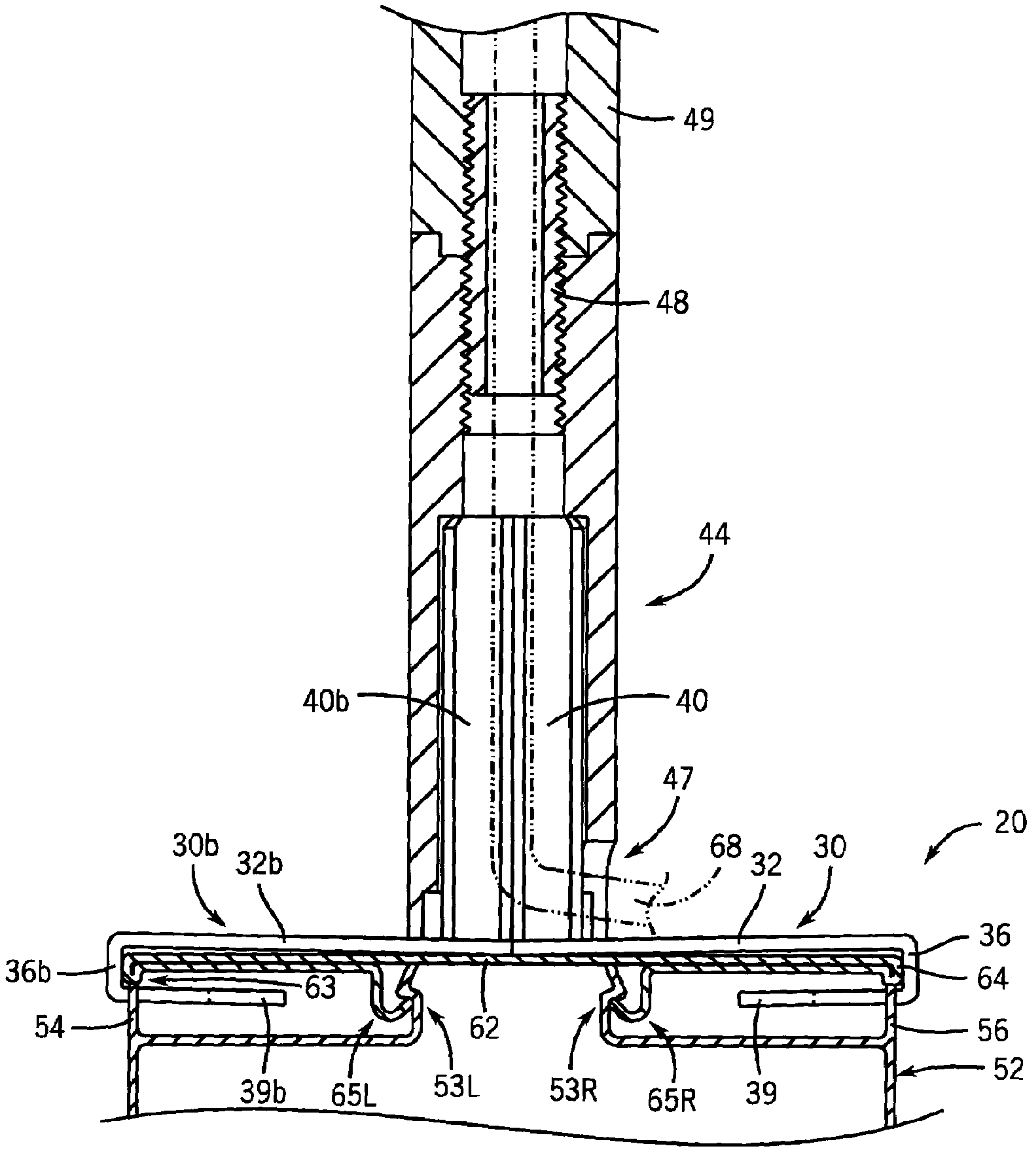
FIG. 7 is an end view of an adapter according to the invention installed on a partition frame.

Turning now to FIGS. 6 and 7, the installation of a top cap 62 on the horizontal top frame member 52 of the partition frame 50 is shown. The top cap 62 has opposed outer edges 63 and 64 and a pair of resilient mounting fingers 65L and 65R that extend downward from the top cap 62. The mounting fingers 65L and 65R of the top cap 62 engage mounting tabs 53L and 53R of the horizontal top frame member 52 of the partition frame 50. The top cap 62 thereby forms a top surface of the workspace panel. Many other mounting means would be suitable for installing the top cap 62 on the horizontal top frame member 52 of the partition frame 50, and the means for mounting the top cap 62 on the horizontal top frame member 52 of the partition frame 50 is not critical to the invention.

The installation of the first bracket 30 and the second bracket **30*b* on the partition frame 50 is illustrated in FIGS. 5-8. The first bracket 30 is dimensioned such that the base 32 may be installed over a first portion of the top cap 62 by inserting flanges 38 and 39 in slots 57*a* and 57*b* in the side 56 of the horizontal top frame member 52. Likewise, the second bracket 30*b* is dimensioned such that the base 32*b* may be installed over a second portion of the top cap 62 by inserting the pair of flanges (of which 39*b* is shown) in slots (similar to slots 57*a* and 57*b*) in the side 54 of the horizontal top frame member 52. Preferably, at least a portion of the inner edge 34 of the first bracket 30 and at least a portion of the inner edge 34*b* of the second bracket 30*b* are placed in abutting or adjacent relationship when the first bracket 30 and the second bracket 30*b* are installed over the top cap 62. When the first bracket 30 and the second bracket 30*b* are installed over the top cap 62 a post structure 42 including the upright wall 40 of the first bracket 30 and the upright wall 40*b* of the second bracket 30*b* is formed. The post structure 42** is suitable for attaching an accessory.

One means for attaching the accessory is stanchion 44 shown in FIGS. 6 and 7. The stanchion 44, which may comprise metallic or polymer materials, includes an internal recess 45. The recess 45 is dimensioned such that the stanchion 44 may be installed on the post structure 42 as shown in FIGS. 6 and 7 by placing the post structure 42 in the recess 45 of the stanchion 44. Thus, the stanchion 44 provides means for attaching the accessory. Optionally, an upper stanchion 49 with an appropriate fastener for attaching to the stanchion 44 may be provided.

FIG. 8 shows a light 69 mounted over the top cap 62 using two adapters 20. However, it should be appreciated that any number of adapters can be used. A power cord 68 provides electric power to the light 68. FIG. 7 shows how the stanchion 44 and the post structure 42 provide for management of the power cord 68 of the light 69. The upright wall 40 of the first bracket 30 and the upright wall **40*b* of the second bracket 30*b* each have a horizontal cross-section in the shape of an arc of less than 180 degrees such that the post structure 42 has a horizontal circular cross-section of an arc of less than 360 degrees. Thus, the post structure has an opening along an entire length of the side. The stanchion 44 also has a hole 47** extending from an outer surface of the stanchion 44 to the recess 45. The hole 47 of the stanchion 44 is dimensioned to accept the power cord 68 of the light 69.

It can appreciated that the adapter 20 provides for flexibility in locating an accessory, such as a light 69, on a workspace panel. The slots along the horizontal top frame member 52 typically run the length of the horizontal top frame member 52. Thus, the first bracket 30 and the second bracket 30*b* may installed over the top cap 62 at numerous locations. Because the stanchion 44 and the post structure 42 provide for management of the power cord 68 of the light 69, there is no need to remove the top cap 62 to reposition lights as the power cord 68 runs outside the workspace panel and down to an electrical outlet.

Figure 9:
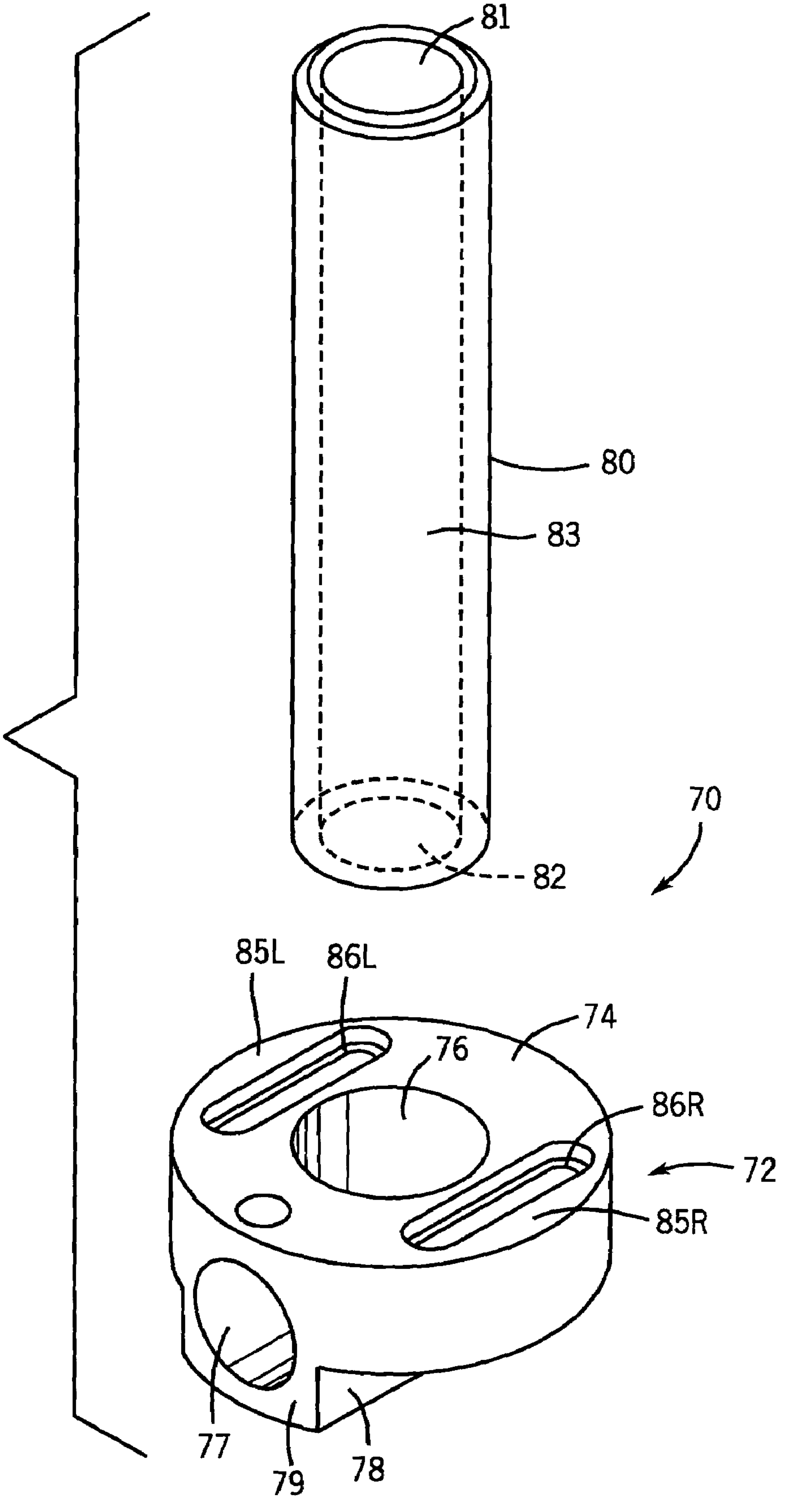
FIG. 9 is an exploded perspective view of a second embodiment of an adapter according to the invention.
Figure 10:
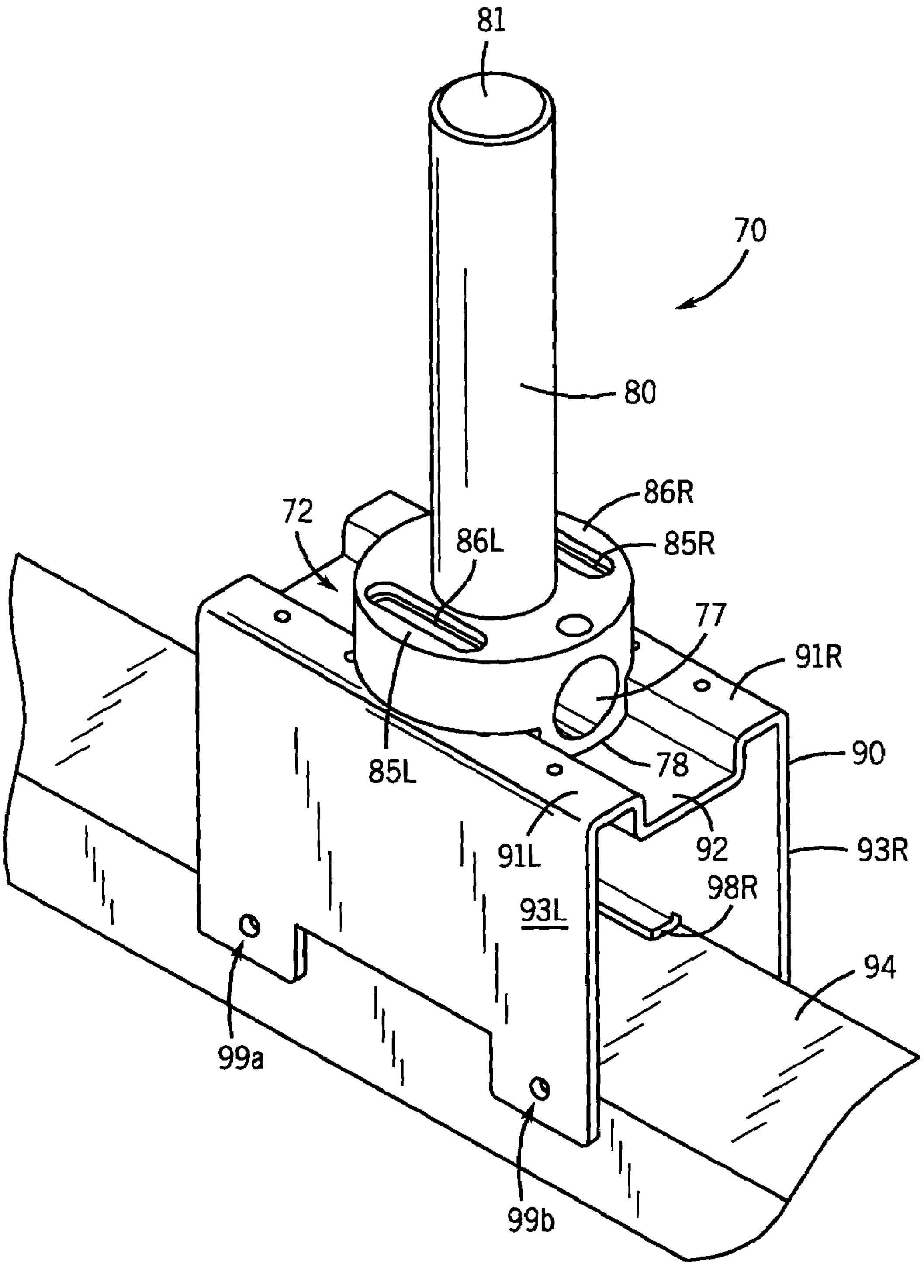
FIG. 10 is a perspective view of the adapter of FIG. 9 installed on the horizontal top frame member of a partition frame using a mounting bracket.
Figure 11:
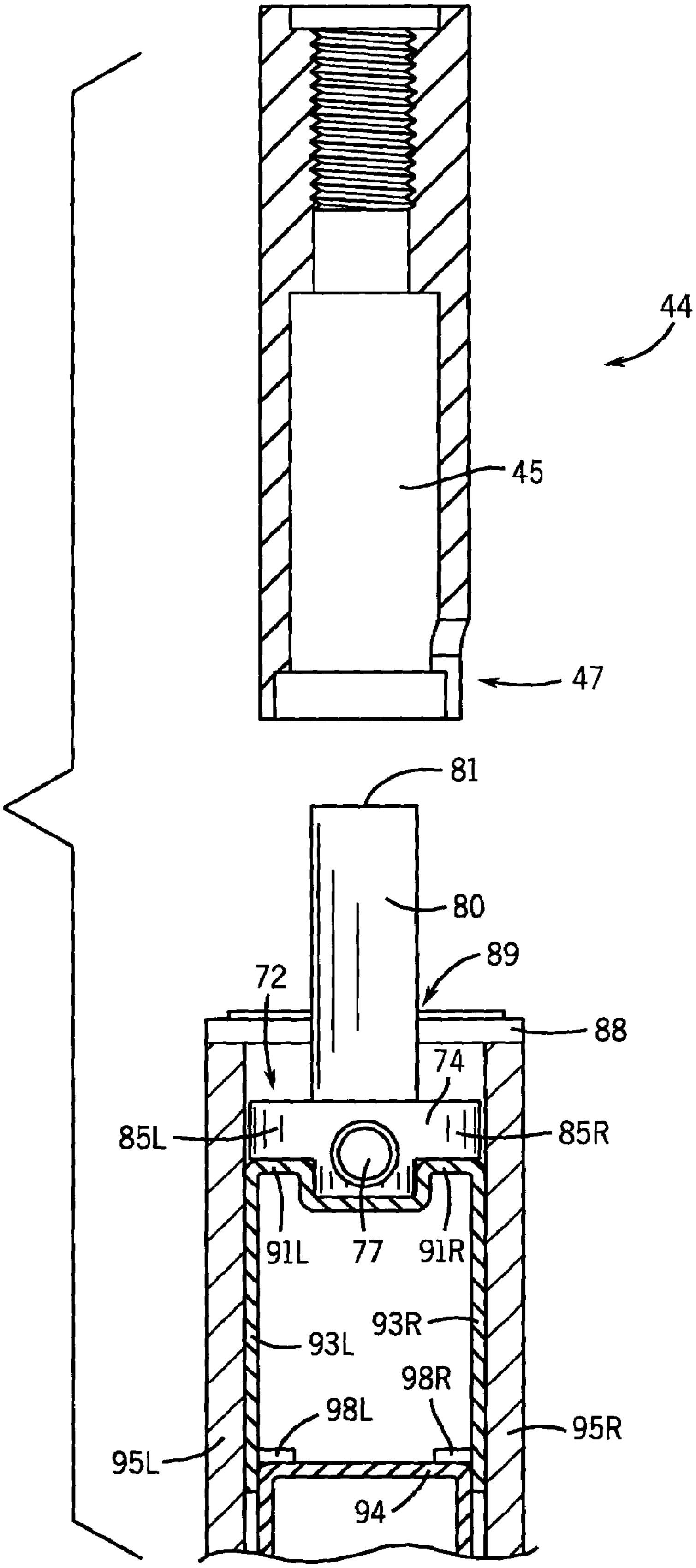
FIG. 11 is an end view of the adapter of FIG. 9 installed on the horizontal top frame member of a partition frame using a mounting bracket.

Turning now to FIGS. 9-11, there is shown a second embodiment of an adapter, indicated generally at 70, for attaching an accessory to a partition frame. The adapter 70 includes a support member 72 and a post 80, both of which may be fabricated from metallic or polymeric materials.

The support member 72 has a base section 74 and an elongated strip 78 extending downwardly from the base section 74. The support member 74 has a passageway extending from an upper orifice 76 in the top surface of the base section 74 to an exit orifice 77 of the support member 72. The exit orifice 77 is located in a side of the support member 72 adjacent or in an end surface 79 of the strip 78 of the support member 72. The base section 74 includes side portions 85L and 85R that include holes 86L and 86R respectively for accepting a fastener.

The post 80 of the adapter 70 has a top end opening 81 and a lower end opening 82 with a pathway 83 running between the top end opening 81 and the lower end opening 82. The post 80 is mounted to the support member 72 such that the lower end opening 82 of the post 80 and the upper orifice 76 of the support member 72 are placed in an adjacent relationship, thereby creating a conduit including the pathway 84 of the post and the passageway 75 of the support member 72. See FIG. 10. Typically, the post 80 and the support member 72 are separate components; however, integral constructions of the post 80 and the support member 72 are possible.

In installations where the horizontal top frame member of the partition frame does not include an upper channel, the adapter 70 includes a mounting bracket 90 as shown in FIG. 10. The mounting bracket is dimensioned for attachment to a horizontal top frame member 94 of a partition frame. In installations where the horizontal top frame member of the partition frame includes an upper channel, the adapter need not include the mounting bracket.

Referring now to FIG. 10, there is shown a mounting bracket 90 that may be used with the adapter 70 in installations where the horizontal top frame member of the partition frame does not include an upper channel. The mounting bracket 90 has an upper surface including opposed top sections 91L and 91R and an upper channel 92 extending downwardly from the upper surface. Opposed side walls 93L and 93R extending downwardly from opposed top sections 91L and 91R respectively. The side walls 93L and 93R each have inwardly directed mounting tabs 98L and 98R best shown in FIG. 11.

Referring to FIGS. 10 and 11, the mounting bracket 90 is installed on the top of the horizontal top frame member 94 of the partition frame by placing mounting tabs 98L and 98R on the top surface of the horizontal top frame member 94 of the partition frame. Holes 99*a* and 99*b* may be provided in the side wall 93L for fasteners for attached the mounting bracket 90 to the horizontal top frame member 94 of the partition frame.

Looking at FIG. 10, the adapter 70 is mounted to the mounting bracket 90 such that the strip 78 of the support member 72 is positioned within the upper channel 92 of the mounting bracket 90. The side portions 85L and 85R of the base section 74 of the support member 72 also contact the opposed top sections 91L and 91R of the upper surface of the mounting bracket 90. Fasteners, such as screws, may be inserted through holes 86L and 86R in side portions 85L and 85R of the base section 74 of the support member 72 to attach side portions 85L and 85R of the base section 74 to the opposed top sections 91L and 91R of the mounting bracket 90.

After the adapter 70 is mounted to the mounting bracket 90, a workspace panel can be constructed as shown in FIG. 11. Covers 95L and 95R are attached to the horizontal top frame member 94 of the partition frame, and the partition frame is topped with a top cap 88 having an aperture 89. The top cap 88 may be attached to the frame using an attachment means analogous to the pair of resilient mounting fingers 65L and 65R of the top cap 62 that engage mounting tabs 53L and 53R of the frame shown in FIG. 7.

The post 80 of the adapter 70 is dimensioned to fit through the aperture 89 of the top cap 88 such that the post 70 extends above the top cap 88 and provides means for attaching an accessory. Stanchion 44, which was described above, has recess 45 such that the stanchion 44 may be installed on the post 80 by placing the post 80 in the recess 45 of the stanchion 44. Thus, the stanchion 44 also provides means for attaching the accessory. Power cord management is provided by the conduit between the top end opening 81 of the post 80 and the exit orifice 77 of the support member 72 which is dimensioned to accept the power cord of the accessory. The power cord may then run along the upper channel 92 of the mounting bracket 90.

Therefore, the present invention provides an adapter for attaching a variety of accessories, such as lights, privacy screens and storage units for pens and files, anywhere along the top of a workspace panel. The adapter is readily attachable to older workspace panels already in use within existing work areas so that office managers can update older workspace panels inexpensively.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. An adapter for attaching an accessory to a partition frame including a top cap having an aperture and including a horizontal top frame member having an upper surface and an upper channel extending downwardly from the upper surface, the adapter comprising:

a post having opposed first and second end openings and a pathway extending between the first and second end openings; and a support member having a base section comprising top, bottom and side surfaces and a protruding strip extending downwardly from the bottom surface of the base section, the support member having a passageway extending from an upper orifice in the top surface of the base section to an exit orifice of the support member, and a stanchion having a recess, the recess being dimensioned such that the stanchion is installed on the post by placing the post in the recess, the stanchion being suitable for attaching the accessory, wherein the post is mounted to the support member such that the second end opening of the post and the upper orifice are placed in an adjacent relationship thereby creating a conduit including the pathway of the post and the passageway of the support member, wherein the strip of the support member is dimensioned to fit within the upper channel of the horizontal top frame member when the adapter is installed on the horizontal top frame member, and wherein the post is dimensioned to fit in the aperture of the top cap, the post being suitable for attaching the accessory the exit orifice is in the side surface of the base section and adjacent or in an end surface of the strip of the base section.

2. The adapter of claim 1 wherein:

the base section is dimensioned such that a portion of the base section contacts the upper surface of the horizontal top frame member when the adapter is installed on the horizontal top frame member.

3. The adapter of claim 2 wherein:

the base section includes at least one hole extending through the base section such that a fastener may be inserted in each hole.

4. The adapter of claim 1 wherein:

the pathway and the passageway are dimensioned to accept a power cord of the accessory.

5. An adapter for attaching an accessory to a partition frame including a top cap having an aperture and including a horizontal top frame member having an upper surface and an upper channel extending downwardly from the upper surface, the adapter comprising:

a post having opposed first and second end openings and a pathway extending between the first and second end openings; and a support member having a base section comprising top, bottom and side surfaces and a protruding strip extending downwardly from the bottom surface of the base section, the protruding strip being spaced inward from an edge of the base section, the support member having a passageway extending from an upper orifice in the top surface of the base section to an exit orifice of the support member, and a stanchion having a recess, the recess being dimensioned such that the stanchion is installed on the post by placing the post in the recess, the stanchion being suitable for attaching the accessory, wherein the post is mounted to the support member such that the second end opening of the post and the upper orifice are placed in an adjacent relationship, wherein the strip of the support member is dimensioned to fit within the upper channel of the horizontal top frame member when the adapter is installed on the horizontal top frame member, and wherein the post is dimensioned to fit in the aperture of the top cap, the post being suitable for attaching the accessory the exit orifice is in the side surface of the base section and adjacent or in an end surface of the strip of the base section.

6. The adapter of claim 5 wherein:

the base section is dimensioned such that a portion of the base section contacts the upper surface of the horizontal top frame member when the adapter is installed on the horizontal top frame member.

7. The adapter of claim 5 wherein:

the base section includes at least one hole extending through the base section such that a fastener may be inserted in each hole.

8. The adapter of claim 5 wherein:

the pathway and the passageway are dimensioned to accept a power cord of the accessory.

* * * * *